United States Patent
Fong et al.

(10) Patent No.: US 11,960,737 B2
(45) Date of Patent: Apr. 16, 2024

(54) SELF-DEPLOYING ENCRYPTED HARD DISK, DEPLOYMENT METHOD THEREOF, SELF-DEPLOYING ENCRYPTED HARD DISK SYSTEM AND BOOT METHOD THEREOF

(71) Applicant: MAXIO TECHNOLOGY (HANGZHOU) CO., LTD., Hangzhou (CN)

(72) Inventors: George Fong, Hangzhou (CN); Zhehang Wen, Hangzhou (CN)

(73) Assignee: MAXIO TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/964,171

(22) Filed: Oct. 12, 2022

(65) Prior Publication Data

US 2023/0114687 A1   Apr. 13, 2023

(30) Foreign Application Priority Data

Oct. 13, 2021   (CN) .......................... 202111193925.9

(51) Int. Cl.
*G06F 12/00*   (2006.01)
*G06F 3/06*   (2006.01)

(52) U.S. Cl.
CPC .......... *G06F 3/0623* (2013.01); *G06F 3/0622* (2013.01); *G06F 3/0632* (2013.01); *G06F 3/0674* (2013.01)

(58) Field of Classification Search
CPC .... G06F 3/0623; G06F 3/0622; G06F 3/0632; G06F 3/0674; G06F 3/0637; G06F 3/0673; G06F 21/78; G06F 21/44; G06F 21/604

See application file for complete search history.

(56) References Cited

U.S. PATENT DOCUMENTS

| 7,765,373 B1 * | 7/2010 | Merry ..................... G06F 21/78 713/193 |
| 2005/0182944 A1 * | 8/2005 | Wagner ................. G06F 21/305 713/182 |

(Continued)

FOREIGN PATENT DOCUMENTS

CN   109918918 A   6/2019

OTHER PUBLICATIONS https://en.wikipedia.org/wiki/Firmware, Firmware (Year: 2020).*
First Office Action, including Search Report, for Chinese Patent Application No. 201910208445.1, dated Sep. 28, 2020, 9 pages.

*Primary Examiner* — Shawn X Gu
*Assistant Examiner* — Mohammad S Hasan
(74) *Attorney, Agent, or Firm* — Westman, Champlin & Koehler, P.A.

(57) ABSTRACT

Disclosed is a self-deploying encrypted hard disk, a deployment method thereof, a system and a boot method thereof. The self-deploying encrypted hard disk comprises a storage medium and a master control unit for placing a host system in communication with the storage medium, which comprises a system data area comprising: a configuration module, wherein when the self-deploying encrypted hard disk boots up under an unconfigured state, executable code of the configuration module is imported into the host system to assist a user in configuring operation characteristics of the self-deploying encrypted hard disk and a system comprising the self-deploying encrypted hard disk; an identity authentication module, wherein when the identity authentication module boots up after the operation characteristics have been configured by the configuration module, the identity authentication module performs security authentication on (Continued)

user identity and operating environment, and grants access permission to a user who has passed the security authentication.

15 Claims, 5 Drawing Sheets

(56) References Cited

U.S. PATENT DOCUMENTS

| | | | | |
|---|---|---|---|---|
| 2011/0296195 | A1* | 12/2011 | Nakagawa | G06F 12/1408 |
| | | | | 713/189 |
| 2012/0011362 | A1* | 1/2012 | Lambert | H04L 9/0844 |
| | | | | 713/168 |
| 2012/0089481 | A1* | 4/2012 | Iozzia | H04N 7/16 |
| | | | | 726/5 |
| 2016/0196294 | A1* | 7/2016 | Tilekar | G06F 16/2365 |
| | | | | 707/691 |
| 2016/0292696 | A1* | 10/2016 | Gong | H04L 67/12 |
| 2017/0213018 | A1* | 7/2017 | Yin | H04L 9/32 |
| 2017/0230362 | A1* | 8/2017 | Wang | H04L 63/0861 |
| 2017/0371573 | A1* | 12/2017 | Kim | G06F 3/0619 |
| 2018/0083943 | A1* | 3/2018 | Bowman | H04L 63/08 |
| 2018/0343260 | A1* | 11/2018 | Ellingson | H04L 63/0838 |
| 2019/0075103 | A1* | 3/2019 | Li | G06F 21/32 |
| 2019/0278897 | A1* | 9/2019 | Zhang | G06F 21/604 |
| 2020/0036707 | A1* | 1/2020 | Callahan | H04L 67/53 |
| 2020/0134209 | A1* | 4/2020 | Zhang | H04L 9/50 |
| 2020/0213287 | A1* | 7/2020 | Zhang | H04L 63/123 |
| 2022/0092189 | A1 | 3/2022 | Fong et al. | |
| 2022/0100910 | A1* | 3/2022 | Cao | G06F 3/0622 |
| 2022/0129390 | A1* | 4/2022 | Shiner | G06F 12/1433 |
| 2022/0398602 | A1* | 12/2022 | Guo | G06F 21/36 |
| 2023/0115278 | A1* | 4/2023 | Turner | G06F 11/1469 |
| | | | | 718/1 |

* cited by examiner

SELF-DEPLOYING ENCRYPTED HARD DISK, DEPLOYMENT METHOD THEREOF, SELF-DEPLOYING ENCRYPTED HARD DISK SYSTEM AND BOOT METHOD THEREOF

CROSS-REFERENCES TO RELATED APPLICATION

This application claims priority to Chinese Application No. 202111193925.9, filed on Oct. 13, 2021, entitled "SELF-DEPLOYING ENCRYPTED HARD DISK, DEPLOYMENT METHOD THEREOF, SELF-DEPLOYING ENCRYPTED HARD DISK SYSTEM AND BOOT METHOD THEREOF", published as CN113642050A on Nov. 12, 2021, the entire contents of which is incorporated herein by reference in their entirety.

FIELD OF THE DISCLOSURE

The present disclosure relates to a technical field of information secure storage, in particular to a self-deploying encrypted hard disk, a deployment method thereof, a self-deploying encrypted hard disk system and a boot method of the self-deploying encrypted hard disk system.

DESCRIPTION OF THE RELATED ART

Currently, data encryption has become an effective means to protect data and privacy, and its application in storage devices is particularly important. For example, for a system in which an encrypted hard disk is equipped, information contained in a central processing unit (CPU) of a host system or memory (RAM) is volatile, that is, with system power supply being cut off, the information will disappear immediately and automatically, without having characteristics of suffering sustained attack. While information stored in a storage device (such as a solid-state drive) is stored in non-volatile storage medium and can be retained for a long time. No matter what causes the storage device to fall into hands of malicious users (stolen, lost, etc.), the information contained in the storage device is at risk of being attacked. If no strong protection measure has been imposed on the data, the data may be maliciously modified, leaked, etc., which may lead to potentially catastrophically undesirable results.

At present, a widely used data protection measure is to use cryptographic algorithm to encrypt the data, so as to ensure that only a validly authorized user can operate the stored data within his permission. The encryption operation can be realized by software in a computer system, such as Bitlocker technology of Microsoft Corporation, which can be realized in any system equipped with Microsoft operating system. However, encryption and decryption operations require significant CPU computing power, and usually cannot be completed transparently in real time. The encryption operation on the stored data can also be realized by special hardware. In order to standardize the behavior of relevant software, hardware and system operating flow, the industry has formulated a series of standards, such as the Trusted Computing Architecture formulated by the international Trusted Computing Group (TCG), especially the architecture according to the TCG Opal protocol, which is specifically developed for storage systems. Applications of this kind of protocol also require storage products to perform standardized operations, including storage medium management, encryption key management, user management and permission management. These related functions are usually implemented by management software (usually provided by commercial software developers, i.e., ISVs short for Independent Software Vendors) running on the host system.

Before the encrypted hard disk can be deployed to performing its data protection function, a series of operating characteristics of the encrypted hard disk must be configured. At present, the configuration, deployment, activation and encryption of the encrypted hard disk need to be realized by third-party software or hardware (commercial products of ISVs). Without the assistance of third-party software and hardware, even if the encrypted hard disk is provided with a high-performance real-time crypto engine, its data protection function cannot be implemented. Adopting third-party software or hardware means increasing cost, which is an undesirable cost for users, making the conventional encrypted hard disk inconvenient to be adopted and increasing management burden, so that the conventional hard disks with encryption function are only used as ordinary hard disks in most cases. The extra deployment cost has been proven to be one of the biggest hurdles in realizing full data protection potentials of conventional SEDs.

SUMMARY OF THE DISCLOSURE

In view of the above problems, an objective of the present disclosure is to provide a self-deploying encrypted hard disk and a deployment method thereof, which can realize configuration and deployment of the self-deploying encrypted hard disk without relying on third-party software and/or hardware, so as to solve problems existing in the prior art.

According to one aspect of the present disclosure, a self-deploying encrypted hard disk is provided, and comprises a master control unit and a storage medium, wherein the master control unit is configured to place a host system in communication with the storage medium to realize data processing and transmission, the storage medium comprises a system data area, wherein the system data area comprises:

a configuration module, wherein when the self-deploying encrypted hard disk boots up under an unconfigured state, executable code of the configuration module is imported into the host system to assist a user in configuring operation characteristics of the self-deploying encrypted hard disk and a system comprising the self-deploying encrypted hard disk;

an identity authentication module, wherein when the identity authentication module boots up after the operation characteristics have been configured by the configuration module, the identity authentication module is configured to perform security authentication on user identity and operating environment, and grant access permission to a user who has passed the security authentication.

In some embodiments, the system data area further comprises: a special code unit, configured to store special boot code in the special code unit, wherein, booted by the special boot code, the executable code in the configuration module is imported into the host.

In some embodiments, the configuration module is configured to import the executable code into the host by using MBR shadowing technology, and the executable code is forced to be firstly imported into the host system from the self-deploying encrypted hard disk.

In some embodiments, the storage medium further comprises a user data area, and an operating system of the self-deploying encrypted hard disk is configured to access the user data area in a logical block addressing mode, while data in the system data area is unable to be accessed by the operating system in the logical block addressing mode.

In some embodiments, wherein the identity authentication module is further configured to perform a system trustworthiness measurement to ensure the system is in a satisfactory trustworthy state.

In some embodiments, configuring, by the configuration module, the operating characteristics of the self-deploying encrypted hard disk comprises: establishing user information; defining partitions of the storage medium; establishing and managing keys of the partitions; and recording and managing a security state of the system.

In some embodiments, the configuration module is configured to generate configuration parameters after configuring the self-deploying encrypted hard disk, and the configuration parameters are stored in the system data area.

According to a second aspect of the present disclosure, a deployment method of a self-deploying encrypted hard disk is provided, wherein the self-deploying encrypted hard disk comprises a master control unit and a storage medium, the storage medium comprises a system data area, the system data area comprises a configuration module and an identity authentication module, and the deployment method comprises:

importing, in response to a command for reading a boot program sent by a host system, executable code of the configuration module into the host system for execution, and entering a configuration state;

assisting the user in configuring the self-deploying encrypted hard disk under the configuration state, and recording configuration parameters in the system data area;

when starting up in a normal operation mode, importing user identity information provided by the host system into the identity authentication module for identity authentication; and granting access permission to a user who has passed the identity authentication.

In some embodiments, before step of importing, in response to the command for reading the boot program sent by the host system, the executable code of the configuration module into the host system for execution, and entering the configuration state, the deployment method further comprises: receiving the command, which is sent by the host system, for reading the boot program, judging whether the self-deploying encrypted hard disk has been configured, wherein, when the self-deploying encrypted hard disk has already been configured, step of importing the user identity information provided by the host system into the identity authentication module to perform the identity authentication is executed until the access permission is granted to a user who has passed the identity authentication;

when the self-deploying encrypted hard disk is unconfigured or needs to be reconfigured, step of importing the executable code of the configuration module into the host system for execution, and entering the configuration state is executed until configuration is completed, and the access permission is granted to a user who has passed the identity authentication.

In some embodiments, step of importing the user identity information provided by the host system into the identity authentication module to perform identity authentication further comprises: perform a trustworthiness measurement on the system, and granting user access permission to a system comprising the self-deploying encrypted hard disk if the system is in a satisfactory trustworthy state.

In some embodiments, step of performing the identity authentication further comprises: entering a configuration modification state and modifying the configuration parameters.

According to a third aspect of the present disclosure, a self-deploying encrypted hard disk system is provided, and comprises:

the self-deploying encrypted hard disk according to the present disclosure; and the host system, which is coupled with the master control unit of the self-deploying encrypted hard disk to realize data transmission, and comprises a system firmware unit and a processor, wherein the system firmware unit is configured to assist the self-deploying encrypted hard disk in completing configuration of operation characteristics.

According to a fourth aspect of the present disclosure, a boot method of a self-deploying encrypted hard disk system is provided, wherein the boot method is executed on the self-deploying encrypted hard disk system according to the present disclosure, and the boot method comprises:

performing, by the system firmware unit, host hardware configuration and self-checking;

sending, by the host system, a command for reading a boot program to the self-deploying encrypted hard disk, and loading a special boot code into the host system;

when the operation characteristics are unconfigured by the self-deploying encrypted hard disk, importing, by the special boot code, the executable code of the configuration module into the host system for execution;

when the operation characteristics have been configured by the self-deploying encrypted hard disk, importing, by the special boot code, security protection code of the identity authentication module into the host system for execution;

after identity authentication is completed, sequentially importing, by the self-deploying encrypted hard disk, codes relating to a master boot record, a boot loader program and an operating system into the host system for execution.

According to the self-deploying encrypted hard disk and the deployment method thereof provided by the present disclosure, a configuration module is arranged inside the self-deploying encrypted hard disk, and is used for configuring operation characteristics of the initialized hard disk. Only after the configuration of the self-deploying encrypted hard disk is completed, user identity authentication function is capable to start to grant access permission to a user who has been authenticated. Since the configuration module is provided inside the self-deploying encrypted hard disk, the operation characteristics can be completely configured by the self-deploying encrypted hard disk itself without relying on any other hardware or software; the self-deploying encrypted hard disk according to embodiments of the present disclosure can be deployed independently as a single device, and is also suitable for centralized deployment of multiple devices; there is no additional cost other than the cost of the self-deploying encrypted hard disk itself; the above-mentioned advantages also make it very suitable for a design of a master SoC (System On a Chip) of an encrypted hard disk.

BRIEF DESCRIPTION OF THE DRAWINGS

The above and other objects, features and advantages of the present disclosure will become more apparent from following descriptions of embodiments of the present disclosure with reference to the accompanying drawings, in which.

DETAILED DESCRIPTION OF EMBODIMENTS OF THE DISCLOSURE

Figure 1:
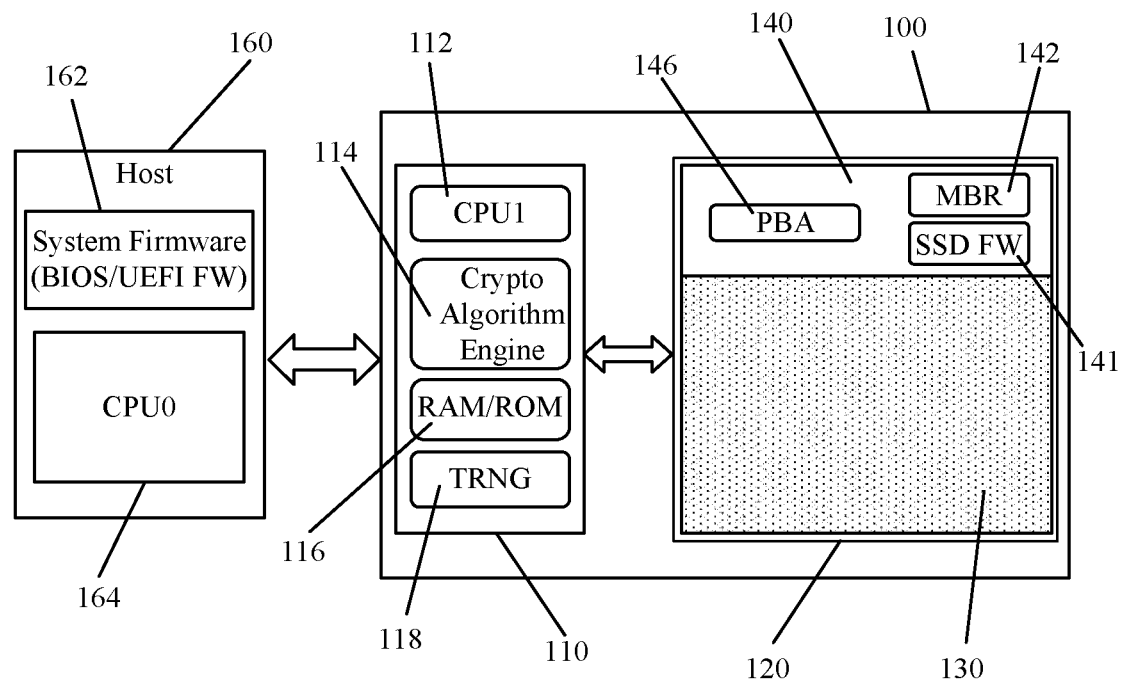
FIG. 1 shows a schematic structural block diagram of a conventional self-encrypting hard disk.

The present invention will be described in more detail below with reference to the accompanying drawings. Throughout the various figures, like elements are denoted by like reference numerals. For the sake of clarity, various parts in the drawings are not drawn to scale. In addition, some well-known parts may not be shown.

The present invention is described below based on embodiments, but the present invention is not limited to these embodiments. In the following detailed description of the present invention, some specific detailed portions are described in detail. By those skilled in the art, the present disclosure can be fully understood without the descriptions of these detailed portions. In order to avoid obfuscating the essence of the present invention, well-known methods, processes, flows, elements and circuits are not described in detail.

Unless the context expressly requires, the words "including", "comprising" and the like throughout the specification and the claims shall be construed in the meaning of inclusion and not in an exclusive or exhaustive sense, that is, those words have the meaning of "including but not limited to". In the description of the present disclosure, it should be understood that the terms "first", "second" and the like are Used for descriptive purposes only and cannot be construed as indicating or implying relative importance. Furthermore, in the description of the present disclosure, "multiple" means two or more, unless otherwise stated.

Specific embodiments of the present disclosure are described in further detail below with reference to the accompanying drawings and embodiments.

FIG. 1 shows a schematic structural block diagram of a conventional self-encrypting hard disk.

At present, most widely used hard disks are provided with hardware encryption function, and this type of hard disks with encryption function are usually called self-encrypting drives (SEDs). A hard disk is, for example, a solid-state drive, which is a storage hard drive made of a solid-state electronic memory chip. A crypto engine in a self-encrypting hard disk usually has enough capacity to encrypt and decrypt data in real time or near real time. FIG. 1 shows a schematic block diagram of a conventional SED. It is also applicable to a trusted computing equipment architecture developed by the international trusted computing group (TCG), especially the architecture according to the TCG Opal protocol, which is specifically developed for storage devices.

As shown in FIG. 1, an encrypted hard disk 100 is configured to communicate with a host system 160 through a host interface. The encrypted hard disk 100 includes a master control unit 110 and a storage medium 120. The master control unit 110 is responsible for data management on the storage medium 120 and is configured as a data transfer device for placing the host system 160 in communication with the storage medium 120, and is configured to receive and process a command from the host system, and perform necessary process, including data error correction, encryption, decryption and the like, on data stream between the host system 160 and the storage medium 120.

Further, the host system 160 includes a system firmware unit 162 (e.g., BIOS/UEFI FW) and a processor 164 (CPU0). The master control unit 110 includes a central processing unit 112 (CPU1), a cryptographic algorithm engine 114, a storage unit 116 (RAM/ROM), and a true random number generator 118 (TRNG), which are used to cooperate with operations of controlling a hard disk subsystem and cryptographic processing. The cryptographic algorithm engine 114 is configured to perform high-speed real-time encryption and decryption on user data which is sent to and from the host system 160 by use of cryptographic algorithm, including, but not limited to, one or more of RSA, which is an asymmetric cryptographic algorithm, AES (Advanced Encryption Standard), which is an symmetric cryptographic algorithm, SM2, and SM3; the central processing unit 112 is used for controlling operation of various components in the hard disk, and the central processing unit 112 is, for example, coupled to the cache unit 116 and is configured to perform storage and release control on data in the hard disk; the cache unit 116 is, for example, RAM or ROM; the true random number generator 118 is configured to generate a key and the generated random code has a required cryptographic strength.

The storage medium 120 is further divided into a user data area 130 and a system data area 140. The user data area 130 can be addressed and accessed by an operating system (OS) and an application program managed by the operating system according to LBA (Logical Block Addressing) mode; the operating system OS and its boot loader program are stored in the user data area 130. In a conventional system based on BIOS (Basic Input Output System), the boot loader program is stored in the LBA 0 address, and is called master boot record (MBR). In a newer UEFI-based system, the boot loader program of the OS is also stored in the user data area 130 according to a predetermined standard manner. The system data area 140 is protected with security and must be accessed via a special interface (e.g., Vendor Command) and cannot be accessed under standard LBA mode by the OS. The system data area 140 includes a firmware code unit 141, a boot code unit 142 and a security authentication unit 146. The firmware code unit 141 is configured to store executable firmware code and relevant data of the hard disk subsystem; the security authentication unit 146 is configured to store security code for judging the identity of the user, so as to ensure that only an authorized user can perform subsequent operations, such as read operation, write operation and the like.

The encrypted hard disk 100 can adopt TCG standard to improve data protection capability, and this kind of protocol also requires encrypted hard disk 100 to perform a series of configuration operations before realizing data protection, such as storage medium management, encryption key management, user management and permission management, etc. These functions, as well as other related operations, are typically centralized and implemented in a management software running in the host system 160. Configuration operation of the encrypted hard disk 100 is described below in conjunction with FIG. 2.

Figure 2:
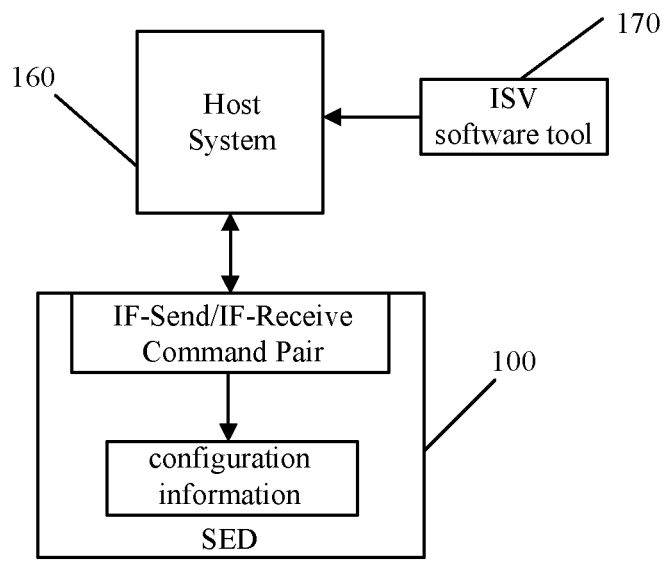
FIG. 2 shows a schematic diagram of a communication manner between the conventional self-encrypting hard disk and a host system via an ISV software tool.

FIG. 2 shows a schematic diagram of a communication manner between the conventional self-encrypting hard disk and a host system via an ISV software tool.

Referring to FIG. 2, for a SED compliant with TCG storage architecture, encryption/decryption-related management function is accomplished through a standard IF-Send/IF-Receive command pair defined for a security management channel on an interface of the host system 160. A configuration software running on the host system 160 is configured to collect functions and parameters, which can be supported by the configuration software, from the SED 100 through the above-mentioned standard command pair, calculate corresponding configuration information according to these parameters and functions required to be realized, and then transmit the corresponding configuration information to the SED 100 through the above-mentioned standard command pair, thus completing the configuration of the SED 100. It is required to complete the above configuration operation for enabling the encrypted hard disk 100, but currently, in an ecosystem based on TCG standard architecture, such software tool providers are collectively referred to as ISV (Independent Software Vendor), software tools provided by whom are usually relatively expensive commercial software tools.

With reference to FIG. 1 and FIG. 2, an ISV software tool 170 runs in the host system 160, so that the host system 160 may collect the functions and parameters supported by the ISV software tool 170 from the encrypted hard disk 100 through the standard IF-Send/IF-Receive command pair, calculate the corresponding configuration information, and then transmit the configuration information to the encrypted hard disk 100 through the above-mentioned standard command pair to complete the configuration of the encrypted hard disk 100. Only after that, the master control unit 110 can enable corresponding encryption and decryption functions of the encrypted hard disk 100, to complete safe access to the storage medium, thus realizing data protection.

Therefore, the conventional SED relies on a software provided by ISV, and the deployment mode of storage products based on TCG Opal or similar standard is more suitable for computing equipment with storage devices (such as notebook computers distributed by IT departments of enterprises, or external storage devices, etc.) directly managed and distributed by enterprises or organizations. It is precisely because of dependence on the software provided by ISV and additional cost burden due to the dependence, that widespread adoption of the encryption function of consumer encrypted hard disks among individual users has been hindered. This is one of the main reasons why most encrypted hard disks are only used as ordinary hard disks. Therefore, the current configuration operation of encrypted hard disk relies too much on the assistance of third-party software and hardware, which makes the conventional encrypted hard disk inconvenient in use and expensive in price, and cannot better realize data protection function.

The present disclosure aims at making improvements on the conventional encrypted hard disk and the deployment method thereof, and providing an improved encrypted hard disk which can be prevented from depending on third-party software and/or hardware during configuration process, and is safe, convenient, and low in cost.

Figure 3:
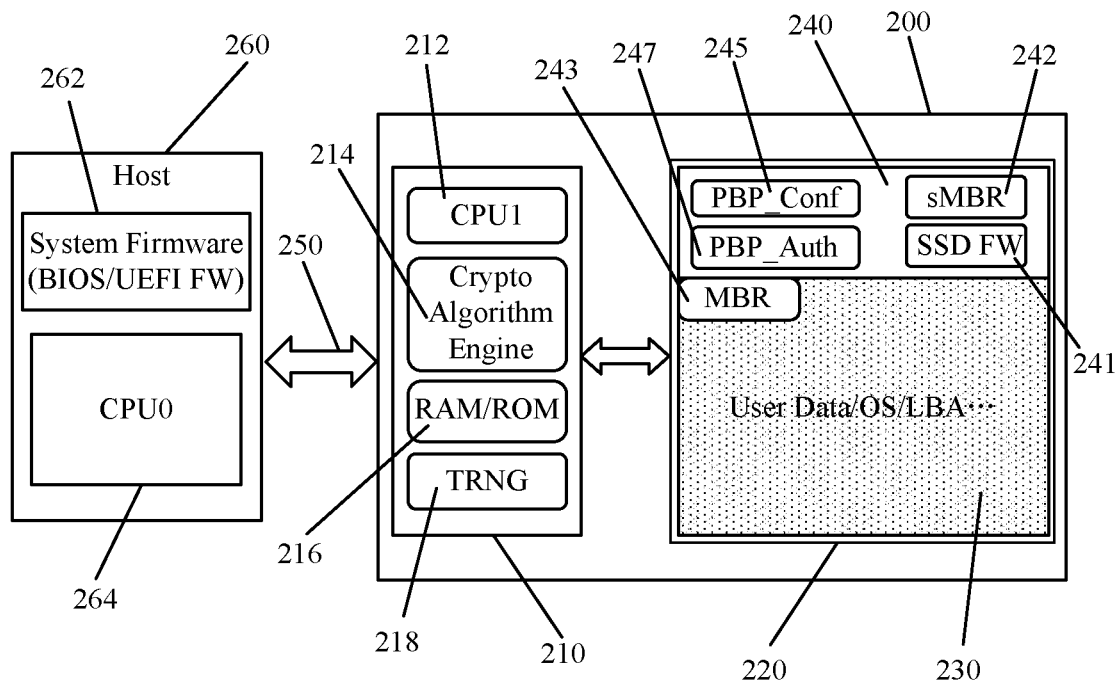
FIG. 3 shows a schematic structural block diagram of a self-deploying encrypted hard disk system and a self-deploying encrypted hard disk according to an embodiment of the present disclosure.

FIG. 3 shows a schematic structural block diagram of a self-deploying encrypted hard disk system and a self-deploying encrypted hard disk according to an embodiment of the present disclosure.

As shown in FIG. 3, the self-deploying encrypted hard disk system of this embodiment includes a host system 260 and a self-deploying encrypted hard disk 200, the self-deploying encrypted hard disk 200 is coupled with the host system 260 through a host interface 250. The self-deploying encrypted hard disk 200 comprises a master control unit 210 and a storage medium 220. The master control unit 210 is coupled with the host system 260 and the storage medium 220, and is configured to perform data transmission and data processing (such as data error correction, encryption and decryption) on a data stream between the host system 260 and the storage medium 220.

The host system 260 comprises a system firmware unit 262 (BIOS/UEFI FW) and a processor 264 (CPU0), the system firmware unit 262 is configured to perform a self-check process after power-on and assist the self-deploying encrypted hard disk 200 to complete a configuration of operational characteristics, and the processor 264 is configured to perform data processing. The storage medium 220 comprises at least one user data area 230 and at least one system data area 240. A pre-boot processing (PBP) module is included within the system data area 240, and comprises a configuration module 245 (PBP_Conf) and an identity authentication module 247 (PBP_Auth). The self-deploying encrypted hard disk 200 according to the embodiments of the present disclosure realizes configuration and security authentication of the self-deploying encrypted hard disk based on the configuration module 245 and the identity authentication module 247, so that a process for configuring the self-deploying encrypted hard disk 200 can be prevented from depending on third-party software.

The self-deploying encrypted hard disk 200 is, for example, a solid-state hard drive. The master control unit 210 in the self-deploying encrypted hard disk is coupled between the host system 260 and the storage medium 220, and is configured to: receive and process a command and data which are sent from the host system 260; report an execution result corresponding to the command to the host system 260 or return data requested by the host system 260; encrypt data from the host system 260 and write the encrypted data into the storage medium 220, or read data from the storage medium 220, decrypt the data from the storage medium 220 and send the decrypted data to the host system 260.

Further, the master control unit 210 comprises: a central processing unit 212 (CPU1), a crypto algorithm engine 214, a storage unit 216 (RAM/ROM), and a true random number generator 218 (TRNG), for cooperating with operations such as hard disk subsystem control operation and cryptographic processing operation. The crypto algorithm engine 214 is configured to perform high-speed real-time encryption and decryption on user data which is transmitted to and from the host system 260 by using a crypto algorithm, preferably, a symmetric encryption and decryption algorithm such as AES or SM4. For a write operation, data transmitted from the host system 260 is encrypted and then stored according to a designated location (LBA) in the storage medium 220. For a read operation, data in the LBA data block designated by the host system 260 can be read out, decrypted with a key corresponding to an authorized partition, and then sent to the host system 260.

The storage medium 220 comprises a user data area 230 and a system data area 240, the user data area 230 can be addressable by an operating system (OS) under LBA mode; the system data area 240 is specially protected and is unable to be accessed under user-mode LBA mode. The operating system OS and its boot loader program are stored in the user data area 130. In a system based on BIOS (Basic Input Output System), the boot loader program is stored in LBA0 address and is called master boot record (MBR). That is, the user data area 230 comprises a master boot code unit 243 (MBR) in which instructions of the master boot record MBR are stored.

The system data area 240 comprises a firmware code unit 241 and a special code unit 242 (e.g., sMBR). The firmware code unit 241 is configured to store executable firmware code of a hard disk subsystem and relevant data, and is referred to as hard disk firmware for short. The hard disk firmware is executable code and data, and is run by the central processing unit 212 in the master control unit 210. The code in the special code unit (e.g., sMBR) 242 is configured to intercept an instruction of the system to read the master boot record MBR in the master boot code unit 243 during boot process, and to return the special boot program (i.e., the special boot code) according to the present disclosure to the host system for execution.

The system data area 240 also comprises two modules running on the host system: a configuration module 245 (PBP_Conf) and an identity authentication module 247 (PBP_Auth). When the self-deploying encrypted hard disk 200 boots up under an unconfigured state, executable code of the configuration module 245 is imported into the host system 260 to assist the user in configuring operating characteristics of the self-deploying encrypted hard disk and the system; when the identity authentication module 247 boots up after the operation characteristics have been configured by the configuration module 245, the identity authentication module 247 is configured to perform security authentication on user identity and operating environment, and grant access permission to a user who has passed the security authentication. A user identity authentication software is embedded in the identity authentication module 247, and encryption disk configuration software is embedded in the configuration module 245. Booted by the special boot code, the executable codes of the configuration module 245 and the identity authentication module are imported into the host system 260.

The configuration module 245 is configured to assist the user in configuring the operating characteristics of the hard disk and the system, comprising but is not limited to one or more of the following operations: performing user establishment; defining partitions of the storage medium; establishing and managing keys of the partitions; and recording and managing a security state of the system; selecting encryption algorithm; entering user login information and assigning user permission to the partitions; recording user identity authentication information; and assigning user permission. The configuration module is a unique module added by the present disclosure invention to overcome disadvantages of the prior art. A function of the configuration module is to complete various configurations required for deploying the encrypted hard disk, so that a user can enable various functions of the encrypted hard disk without relying on any external software. When the configuration module is required to be booted up, the configuration module must be the first module, that can be loaded and operated, in the system boot chain.

A function of the identity authentication module 247 is to: perform authentication on the user identity and the operating environment; and after the operation characteristics have been configured by the self-deploying encrypted hard disk 200, when the self-deploying encrypted hard disk 200 enters a protection state due to each power-on or reset process, unlock the self-deploying encrypted hard disk 200 according to the identity authentication information provided by the user, so that the self-deploying encrypted hard disk 200 may enter an operation state according to its permission. After each configuration is completed by the configuration module 245, the identity authentication module 247 is the first module, that can be loaded and operated, in the system boot chain.

Specifically, when the self-deploying encrypted hard disk 200 is unconfigured or needs to be reconfigured, the configuration module 245 is configured to import the executable code in the configuration module 245 into the host system 260 by using the MBR shadowing technology, and the executable code in the configuration module 245 is forced to be the first executable program code to be imported into the host system 260 from the self-deploying encrypted hard disk 200; after the self-deploying encrypted hard disk 200 completes configuration, a security protection code in the identity authentication module 247 is imported into the host system 260 first after power-on. Therefore, after the system is powered on, the code corresponding to the configuration module 245 or the identity authentication module 247 is loaded into the host system 260 by the special code unit 242 according to whether the self-deploying encrypted hard disk 200 has been configured or not, and then corresponding functions can be completed.

Specific implementation exemplary steps of the above-mentioned MBR shadowing technology can be briefly described as follows:

Firstly, the system is powered on; the host system 260 sends a command to read boot program to the self-deploying encrypted hard disk 200, for example, based on MBR in the BIOS-based system, the MBR 243 access request has been mapped to the shadow MBR (sMBR) 242 in the system data area 240 during system configuration stage; in response to a boot program read command of the system, the hard disk subsystem imports the special boot code (sMBR), into the host system 260; the host system 260 runs the above-described special boot code and imports the executable code in the configuration module 245 from the system data area 240 into the host system 260 for execution. At this time, after the system is powered on, the executable code of the configuration module 245 is imported into the host system 260 for execution prior to codes of other modules, so that the configuration module 245 enters an operation state first after power-on, thus the self-deploying encrypted hard disk 200 can enter a configuration state. After that, the special boot code is configured to import the security protection code inside the identity authentication unit 247 into the host system 260 to perform system trustworthiness verification and user identity authentication; after that, the code in an actual MBR 243 or OS Loader is exported to the host system 260, and subsequent normal steps in the system boot chain can be performed to complete system booting.

Since the executable code of the configuration module 245 is forced to be the first code to be run according to the above mechanism, the system will run the configuration module first 245 after power-on to complete the configuration of the self-deploying encrypted hard disk 200. Since the configuration module 245 is located inside the system data area 240, there is no need to rely on third-party software, and the configuration function is performed first in order, security performance of the self-deploying encrypted hard disk 200 can be guaranteed. In addition, the self-deploying encrypted hard disk 200 in the above-mentioned state is a new disk that has just been manufactured or a hard disk that has been restored to its original state, that is, the self-deploying encrypted hard disk 200 in the above-mentioned state is under unconfigured state, so the configuration function should be executed first in order after power-on. However, if the self-deploying encrypted hard disk 200 has already been configured, the identity authentication unit 247 is operated first in order by the host system 260 after power-on. When the self-deploying encrypted hard disk 200 needs to be reconfigured, the configuration function is also performed first in order after power-on.

To sum up, the present disclosure discloses an implementation scheme of a self-deploying encrypted hard disk deployment system that is especially suitable for an integrated circuit application. When the system is powered on, the executable code stored in the configuration module 245 is executed by MBR shadowing technology or the like before any other executable code is transferred to the host system 260. The executable code stored in the configuration module 245 is executed before any data accessing process, so that configurations on new disk format, authentication information and other necessary information can be completed according to security policy requirements, without relying on third-party software, and is suitable for both single-device deployment and/or centralized deployment of multiple devices, and is safe, convenient and low in cost.

In addition, the present disclosure further provides a deployment method of the self-deploying encrypted hard disk, which is described in detail with reference to FIGS. 4 to 6.

Figure 4:
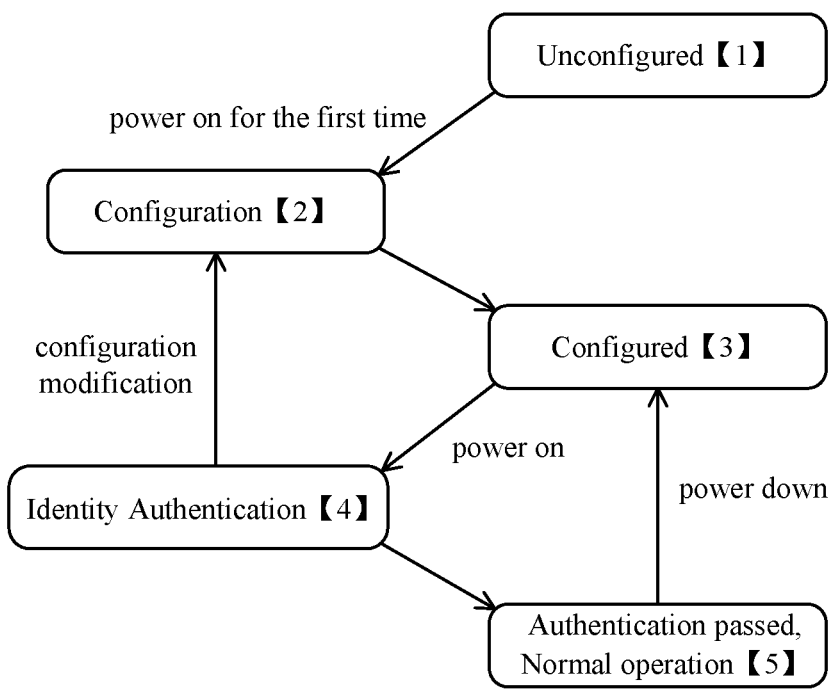
FIG. 4 shows a lifecycle state transition diagram of a self-deploying encrypted hard disk according to an embodiment of the present disclosure.

FIG. 4 shows a lifecycle state transition diagram of a self-deploying encrypted hard disk according to an embodiment of the present disclosure.

As shown in FIG. 4, a plurality of different states of the self-deploying encrypted hard disk 200 during lifecycle are given, specifically comprising:

Stage 1: Unconfigured (Initial) Stage.

A newly manufactured self-deploying encrypted hard disk 200 is in an unconfigured state ("Manufactured & Initialized" state). The unconfigured state is a default state of a new disk leaving a production line or a state of a reinitialized hard disk, which can also be entered by a revert operation executed by a privileged user. The revert operation may be used to restore the self-deploying encrypted hard disk 200 to its original factory state for redeployment.

Stage 2: Configuration Stage.

When the self-deploying encrypted hard disk 200 is powered up for the first time in user's hand, the self-deploying encrypted hard disk 200 enters "Configuration" state from the "Unconfigured" state. In the configuration state, when the host system 260 sends a command for reading a boot module (e.g., MBR in BIOS or OS Loader in UEFI environments) to the self-deploying encrypted hard disk 200, the self-deploying encrypted hard disk 200 will import the configuration module 245 into the host system 260 in an appropriate manner, and the configuration module 245 is booted. The configuration module 245 running in this state will assist the user to complete an operation behavior configuration on the encrypted hard disk, so that the encrypted hard disk can have required operation characteristics. The configuration module 245 is configured to perform user establishment, assist a user in completing operations such as partitioning, recording user identity authentication information, assigning user permissions, etc., and record configuration information of each operation into the system data area 240 in the self-deploying encrypted hard disk 200.

Stage 3: Configured Stage.

This state is entered after the configuration is completed, and the hard disk that has completed the configuration operation is configured to enter the "Configured" state. Under this state, all configuration parameters have been recorded in the non-volatile system data area 240. At this time, power-down will not affect the configuration state, that is, the configuration parameters will be retained after power-down. Under this state, user data will be protected in a predetermined way. Only an authorized user can access with the permission which is granted to that user during configuration, and an unauthorized user or an unauthorized operation (read, write, or erase operation) by an authorized user will be denied.

Stage 4: Identity Authentication Stage.

When the self-deploying encrypted hard disk 200 is repowered or reset under the "configured" state, an "identity authentication" state is entered. This state can also be an implicit state, that is, this state can be a part of some operations. Under this state, the configured hard disk is configured to boot the identity authentication module 247 when power on, and the identity authentication module 247 is imported into the host system 260 for execution. The identity authentication module 247 is used to authenticate user identity and grant access permission corresponding to the user identity. After configuration, data on the hard disk can be protected. Data operation, such as read, write, or erase operation, can only be performed with a corresponding assigned permission if the user is authenticated. Specifically, after entering the identity authentication state, the identity authentication module 247 is configured to receive the user identity authentication information from the host interface 250 and compare the received user identity authentication information with a user identity authentication information recorded in the hard disk during the configuration stage, according to a predetermined algorithm, so as to determine whether the visitor has been granted with the required permission. Only after the identity authentication information is confirmed to be valid, can the subsequent operation stage be entered.

After the identity authentication, the system may return to the second state to re-enter the configuration state, in order to modify the completed configuration information, or reinitialize the hard disk. Or, after the identity authentication, the system may enter a fifth stage.

Stage 5: normal operation stage after the authentication is passed.

Once the user identity has been authenticated, the corresponding access permission can be granted to the user, so that the user can access data according to the access permissions for the user. After the identity authentication has been passed, the normal operation ("Authenticated & Operational") stage is entered. In this stage, the user has passed the user identity authentication, and user-mode data can be accessed according to the corresponding permissions of the user. And the user may have sufficient access permissions, such as permissions to read, write and/or erase. After that, the user can perform read, write or erase operation on a partition and data with a corresponding permission under this state.

Figure 5A:
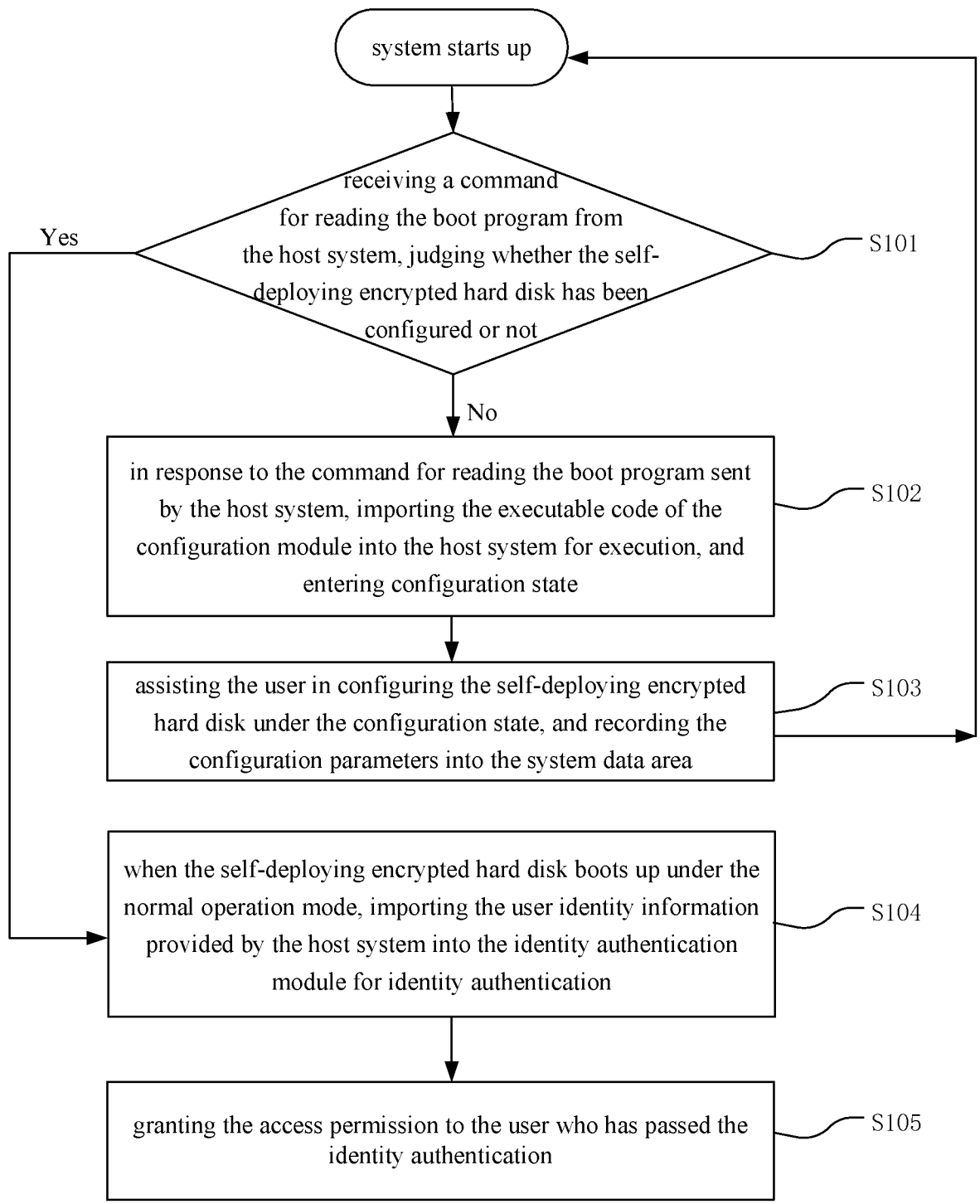
FIG. 5*a* shows a flowchart diagram of a deployment method of a self-deploying encrypted hard disk according to a first embodiment of the present disclosure.

FIG. 5a shows a flowchart diagram of a deployment method of a self-deploying encrypted hard disk according to a first embodiment of the present disclosure.

This flowchart diagram corresponds to the various states shown in FIG. 4. As shown in FIG. 5a, in step S101, after the system starts up, a command for reading the boot program is received from the host system, and regardless whether the self-deploying encrypted hard disk has been configured or not.

In this step, the self-deploying encrypted hard disk 200 is configured to receive the command for reading the boot program from the host system 260 and then judge whether the self-deploying encrypted hard disk 200 has been configured or not at this time. If it is judged that the self-deploying encrypted hard disk 200 has not been configured, step S102 is then executed; otherwise, step S104 is then executed.

In step S102, in response to the command for reading the boot program sent by the host system, the executable code of the configuration module is imported into the host system for execution, and the configuration state is entered.

In this step, when the self-deploying encrypted hard disk 200 has not been configured, the executable code of the configuration module 245 is forced to be the first executable program code to be imported into the host system 260 in response to the read command from the host system 260, then the configuration state is entered, and corresponding steps are executed with reference to FIG. 4.

In step S103, the user is assisted in configuring the self-deploying encrypted hard disk under the configuration state, and the configuration parameters are recorded into the system data area.

In this step, a series of configurations are performed on the self-deploying encrypted hard disk 200 to make it operate in a configured state, and the obtained configuration parameters are recorded in the system data area 240. The data in the system data area 240 will not volatilize, thus having strong storage performance, and the configuration parameters are still retained even after power-down.

After step S103 is executed, the deployment method may enter a power-off state, or return to step S101 again to re-judge whether the self-deploying encrypted hard disk has been configured, if it is judged that the self-deploying encrypted hard disk has not been configured, which means that the previous configuration is unsuccessful, steps S102 and S103 can be subsequently executed to re-configure the self-deploying encrypted hard disk; if it is judged that the self-deploying encrypted hard disk has already been configured, step S104 is then executed.

In step S104, when the self-deploying encrypted hard disk boots up under the normal operation mode, the user identity information provided by the host system is imported into the identity authentication module for identity authentication.

In this step, in response to a read command from the host system 260, when the identity authentication module 247 boots up in the normal operation mode, the security authentication code in the identity authentication module 247 is imported into the host system 260, and the user identity information from the host system 260 is compared with the information stored in the hard disk. If the identity authentication is completed and user identity is authenticated, a corresponding access permission can be granted to the authorized user.

Further, the step also comprises: measuring a the trustworthiness of the system, and granting user access permission to the system only if the system is in a trustworthy state. This can further improve security.

In step S105, the access permission is granted to the user who has passed the identity authentication, and/or read, write and/or erase operations on data can be performed.

In this step, the user has passed the identity authentication successfully, thus the user is granted with access permission, and corresponding read, write and/or erase operation can be performed.

In addition, after step S104 is performed for the identity authentication, the deployment method further comprises: entering a configuration modification state and modifying the configuration parameters. In this step, after the user identity authentication is completed, the user can re-enter the configuration state, to modify the completed configuration parameters, or re-initialize the hard disk, so that configuration modification is flexible and may adapt to a wide range of scenarios.

Therefore, the deployment method of the self-deploying encrypted hard disk according to the embodiment may be completed. The deployment method of the self-deploying encrypted hard disk can first configure the operation characteristics of an initialized self-deploying encrypted hard disk by controlling the sequence of codes run by the host system, and then start to authenticate user identity after the configuration is completed, so as to grant access permission to the authorized user. Therefore, the configuration of operation characteristics can be completed by the hard disk itself without relying on any other hardware or software other than the self-deploying encrypted hard disk itself, thus simplifying operation flow and the whole process can be executed with high-level of security.

Figure 5B:
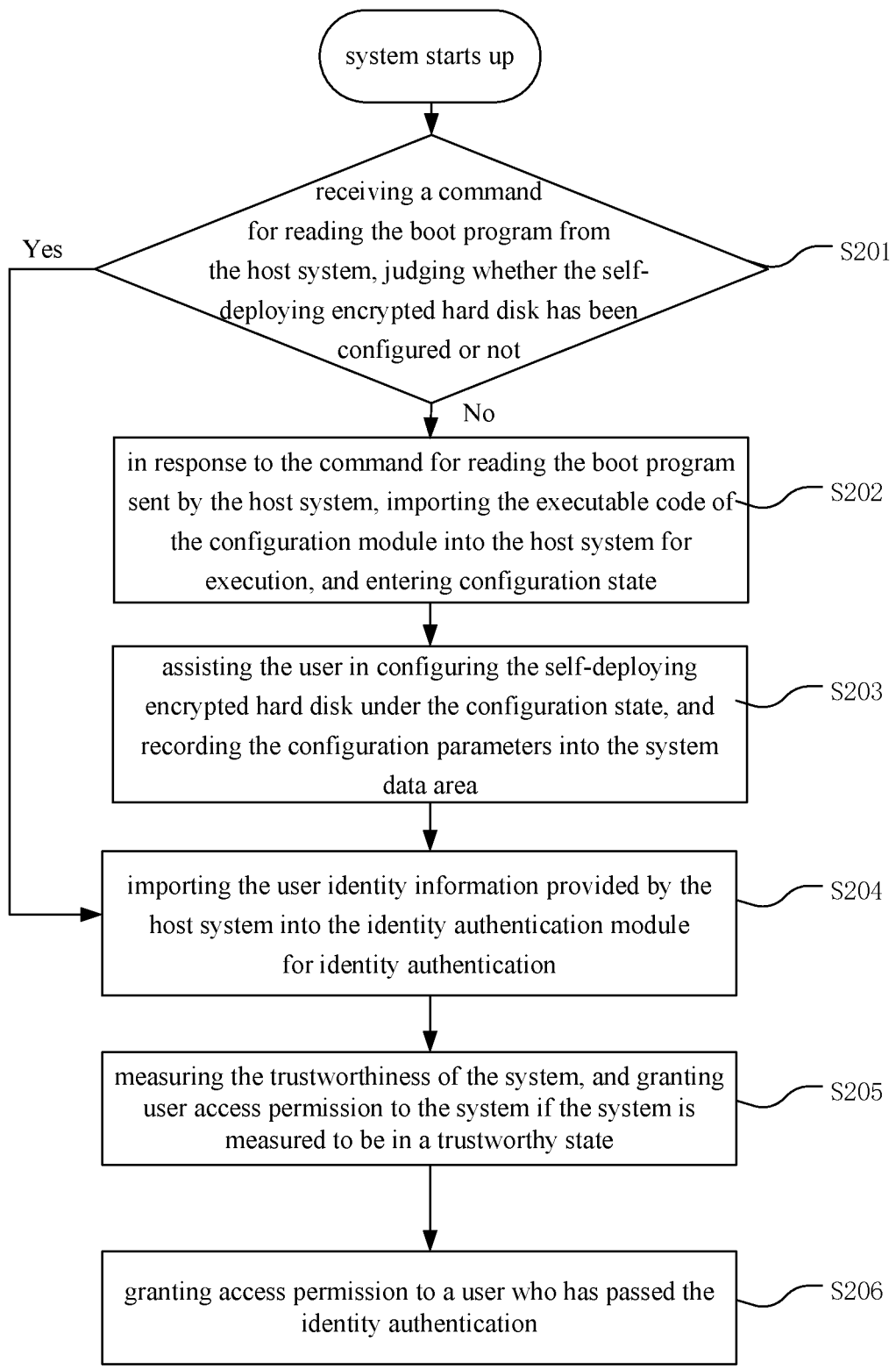
FIG. 5*b* shows a flowchart diagram of a deployment method of a self-deploying encrypted hard disk according to a second embodiment of the present disclosure.

FIG. 5b shows a flowchart diagram of a deployment method of a self-deploying encrypted hard disk according to a second embodiment of the present disclosure.

As shown in FIG. 5b, similar to the embodiment shown in FIG. 5a, the deployment method comprises steps S201 to S206.

In step S201, after the system starts up, a command for reading the boot program sent by the host system is received, regardless whether the self-deploying encrypted hard disk has been configured or not.

In step S202, in response to the command for reading the boot program sent by the host system, the executable code of the configuration module is imported into the host system for execution, then the configuration state is entered.

In step S203, a user is assisted in configuring the self-deploying encrypted hard disk under the configuration state, and the configuration parameters are recorded into the system data area.

These steps are the same as steps S101 to S103 according to the first embodiment and will not be described in detail. A difference between the second embodiment and the first embodiment is that, after step S203, step S204 is directly executed, that is, the step to perform the identity authentication is executed directly after the step of configuring the self-deploying encrypted hard disk has been executed.

In step S204, the user identity information provided by the host system is imported into the identity authentication module for identity authentication.

In step S205, the trustworthiness of the system is measured, and user access permission is granted to the system if the system is measured to be in a trustworthy state.

This embodiment is different from the first embodiment in that, the trustworthiness measurement performed on the system is taken as a single execution step, and after the authentication step, the trustworthiness measurement can be subsequently performed only when the identity authentication has been completed, otherwise the authentication is considered to be failed immediately, instead of performing the identity authentication and the trustworthiness measurement at the same time.

In step S206, access permission is granted to a user who has passed the identity authentication, and read, write and/or erase operation can be performed on data.

This step is also the same as that of the first embodiment and will not be described in detail. Through either of the two embodiments, the self-deploying encrypted hard disk can automatically complete the configuration of operation characteristics without relying on any other external hardware or software, thus simplifying operation flow, and the whole process can be executed with high-level security.

Figure 6:
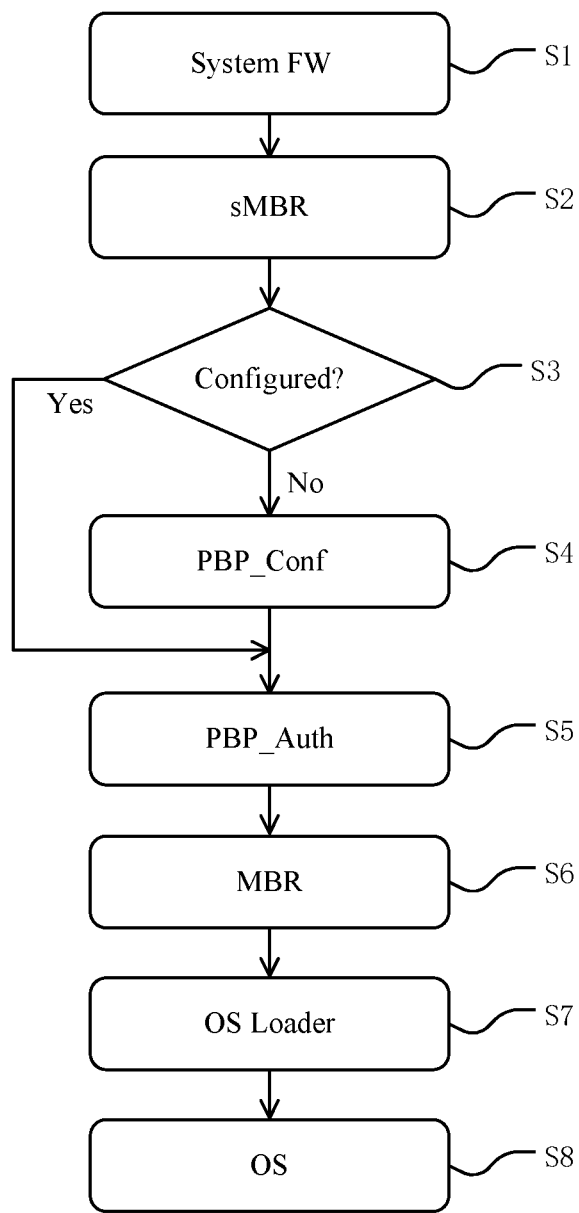
FIG. 6 shows a schematic diagram of a system boot chain corresponding to a self-deploying encrypted hard disk according to an embodiment of the present disclosure.

FIG. 6 shows a schematic diagram of a system boot chain corresponding to a self-deploying encrypted hard disk according to an embodiment of the present disclosure.

When the system starts up and a series of steps shown in FIG. 4 and FIG. 5a (or FIG. 5b) are performed, the above functional modules will be imported into the host system 260 and run in a certain order. These functional modules form the "boot chain" of the system. FIG. 6 shows an exemplary system boot chain, which also represents the boot method applied to the self-encryption system shown in FIG. 3. A boot sequence of the functional modules during the boot process of the BIOS-based system is shown in the figure. A boot chain of a UEFI firmware-based system may also have similar behavior. A brief description of the system boot chain based on the present disclosure is provided below, by taking FIG. 6 as an example.

As shown in FIG. 6, in step S1: run system firmware. The system firmware (BIOS, or UEFI firmware) starts to run first in order, after the system is powered up. The system firmware of the host system 260 is configured to perform system hardware configuration and self-checking process.

In step S2: run sMBR. After the system firmware completes configuration and the self-checking process, the host system 260 is configured to send a command for reading the boot program to the self-deploying encrypted hard disk 200, load and execute the sMBR.

In step S3: determine whether it has been configured. If the self-deploying encrypted hard disk 200 has not completed functional configuration, PBP_Conf functional module can be loaded into the sMBR for execution, so as to complete the functional configuration (step S4). Otherwise, sMBR will load and execute the PBP_Auth module to perform user identity authentication to complete user login (step S5).

In step S4: run PBP_Conf. The self-deploying encrypted hard disk 200 starts to enter the configuration state.

In step S5: run PBP_Auth. After the configuration is completed, the identity authentication step is entered and the user identity authentication starts.

In step S6 to S8: after the user identity authentication and login process are completed, codes related to MBR (Master Boot Record), OS Loader (Boot Loader Program) and OS (Operating System) will be imported into the host system 260 in turn for execution, so that the system boot process can be completed. Thus, the boot chain of the system is completed. The boot chain matches the steps shown in FIG. 4 to FIG. 5a (or FIG. 5b).

To sum up, according to the self-deploying encrypted hard disk and the deployment method thereof provided by the present disclosure, a configuration module is arranged inside the self-deploying encrypted hard disk, and is used for configuring operation characteristics of the initialized hard disk. Only after the configuration of the self-deploying encrypted hard disk is completed, user identity authentication function is capable to start to grant access permission to a user who has been authenticated. Since the configuration module is provided inside the self-deploying encrypted hard disk, the operation characteristics can be completely configured by the self-deploying encrypted hard disk itself without relying on any other hardware or software; the self-deploying encrypted hard disk according to embodiments of the present disclosure can be deployed independently as a single device, and is also suitable for centralized deployment of multiple devices; there is no additional cost other than the cost of the self-deploying encrypted hard disk itself; the above-mentioned advantages also make it very suitable for a design of a master SoC (System On a Chip) of an encrypted hard disk.

It should be understood that although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. There is no need and cannot be an exhaustive list of all embodiments herein. The invention is intended to cover alternatives, modifications and equivalents that may be included within the spirit and scope of the invention as defined by the appended claims.

What is claimed is:

1. A self-deploying encrypted hard disk, comprising a master control unit and a storage medium, wherein the master control unit is configured to place a host system in communication with the storage medium to realize data processing and transmission, the storage medium comprises a system data area, wherein the system data area comprises:
   a configuration module, wherein when the self-deploying encrypted hard disk boots up under an unconfigured state, executable code of the configuration module is imported into the host system to assist a user in configuring operation characteristics of the self-deploying encrypted hard disk and a system comprising the self-deploying encrypted hard disk;
   an identity authentication module, wherein when the identity authentication module boots up after the operation characteristics have been configured by the configuration module, the identity authentication module is configured to perform security authentication on user identity and operating environment, and grant access permission to a user who has passed the security authentication,
   wherein before user identity information provided by the host system is imported into the identity authentication module for identity authentication, the executable code of the configuration module is imported into the host system for configuring the operation characteristics of the self-deploying encrypted hard disk.

2. The self-deploying encrypted hard disk according to claim 1, wherein the system data area further comprises:
   a special code unit, configured to store special boot code in the special code unit, wherein, booted by the special boot code, the executable code in the configuration module is imported into the host system.

3. The self-deploying encrypted hard disk according to claim 1, wherein the configuration module is configured to import the executable code into the host system by using MBR shadowing technology, and the executable code is forced to be firstly imported into the host system from the self-deploying encrypted hard disk.

4. The self-deploying encrypted hard disk according to claim 1, wherein the storage medium further comprises a user data area, and an operating system of the self-deploying encrypted hard disk is configured to access the user data area in a logical block addressing mode, while data in the system data area is unable to be accessed by the operating system in the logical block addressing mode.

5. The self-deploying encrypted hard disk according to claim 1, wherein the identity authentication module is further configured to perform a system trustworthiness measurement to ensure the system operating environment is in a trustworthy state.

6. The self-deploying encrypted hard disk according to claim 1, wherein configuring, by the configuration module, the operating characteristics of the self-deploying encrypted hard disk comprises: establishing user information; defining partitions of the storage medium; establishing and managing keys of the partitions; and recording and managing a security state of the system.

7. The self-deploying encrypted hard disk according to claim 6, wherein the configuration module is configured to generate configuration parameters after configuring the self-deploying encrypted hard disk, and the configuration parameters are stored in the system data area.

8. A deployment method of a self-deploying encrypted hard disk, wherein the self-deploying encrypted hard disk comprises a master control unit and a storage medium, the storage medium comprises a system data area, the system data area comprises a configuration module and an identity authentication module, and the deployment method comprises:
  importing, in response to a command for reading a boot program sent by a host system, executable code of the configuration module into the host system for execution, and entering a configuration state;
  assisting the user in configuring the self-deploying encrypted hard disk under the configuration state, and recording configuration parameters in the system data area;
  when starting up in a normal operation mode, importing user identity information provided by the host system into the identity authentication module for identity authentication; and
  granting access permission to a user who has passed the identity authentication,
  wherein before the user identity information provided by the host system is imported into the identity authentication module for identity authentication, the executable code of the configuration module is imported into the host system for configuring operation characteristics of the self-deploying encrypted hard disk.

9. The deployment method according to claim 8, wherein, before step of importing, in response to the command for reading the boot program sent by the host system, the executable code of the configuration module into the host system for execution, and entering the configuration state, the deployment method further comprises: receiving the command, which is sent by the host system, for reading the boot program, judging whether the self-deploying encrypted hard disk has been configured,
  wherein, when the self-deploying encrypted hard disk has already been configured, step of importing the user identity information provided by the host system into the identity authentication module to perform the identity authentication is executed until the access permission is granted to a user who has passed the identity authentication;
  when the self-deploying encrypted hard disk is unconfigured or needs to be reconfigured, step of importing the executable code of the configuration module into the host system for execution, and entering the configuration state is executed until configuration is completed, and the access permission is granted to a user who has passed the identity authentication.

10. The deployment method according to claim 8, wherein, step of importing the user identity information provided by the host system into the identity authentication module to perform identity authentication further comprises: perform a trustworthiness measurement on a system comprising the self-deploying encrypted hard disk, and granting user access permission to the system if the system is measured to be in a trustworthy state.

11. The deployment method according to claim 8, wherein step of performing the identity authentication further comprises: entering a configuration modification state and modifying the configuration parameters.

12. A self-deploying encrypted hard disk system, comprising:
  the self-deploying encrypted hard disk according to claim 1; and
  the host system, which is coupled with the master control unit of the self-deploying encrypted hard disk to realize data transmission, and comprises a system firmware unit and a processor, wherein the system firmware unit is configured to assist the self-deploying encrypted hard disk in completing configuration of operation characteristics.

13. A boot method of a self-deploying encrypted hard disk system, wherein the boot method is executed on the self-deploying encrypted hard disk system according to claim 12, and the boot method comprises:
  performing, by the system firmware unit, host hardware configuration and self-inspection;
  sending, by the host system, a command for reading a boot program to the self-deploying encrypted hard disk, and loading a special boot code into the host system;
  when the operation characteristics are unconfigured by the self-deploying encrypted hard disk, importing, by the special boot code, the executable code of the configuration module into the host system for execution;
  when the operation characteristics have been configured by the self-deploying encrypted hard disk, importing, by the special boot code, security protection code of the identity authentication module into the host system for execution;
  after identity authentication is completed, sequentially importing, by the self-deploying encrypted hard disk, codes relating to a master boot record, a boot loader program and an operating system into the host system for execution.

14. The self-deploying encrypted hard disk according to claim 2, wherein the special code unit is configured to return the special boot code to the host system for execution, when an instruction of the system to read master boot record is intercepted by the special code unit during boot process, wherein instructions of the master boot record is stored in a user data area of the storage medium.

15. The self-deploying encrypted hard disk according to claim 1, wherein after identity authentication is completed, the self-deploying encrypted hard disk is configured to sequentially import codes relating to a master boot record, a boot loader program, and an operating system into the host system for execution.

* * * * *